No. 632,362. Patented Sept. 5, 1899.
A. F. PAGE.
SIEVE FOR SEPARATORS, FANNING MILLS, &c.
(Application filed Aug. 3, 1898.)
(No Model.)
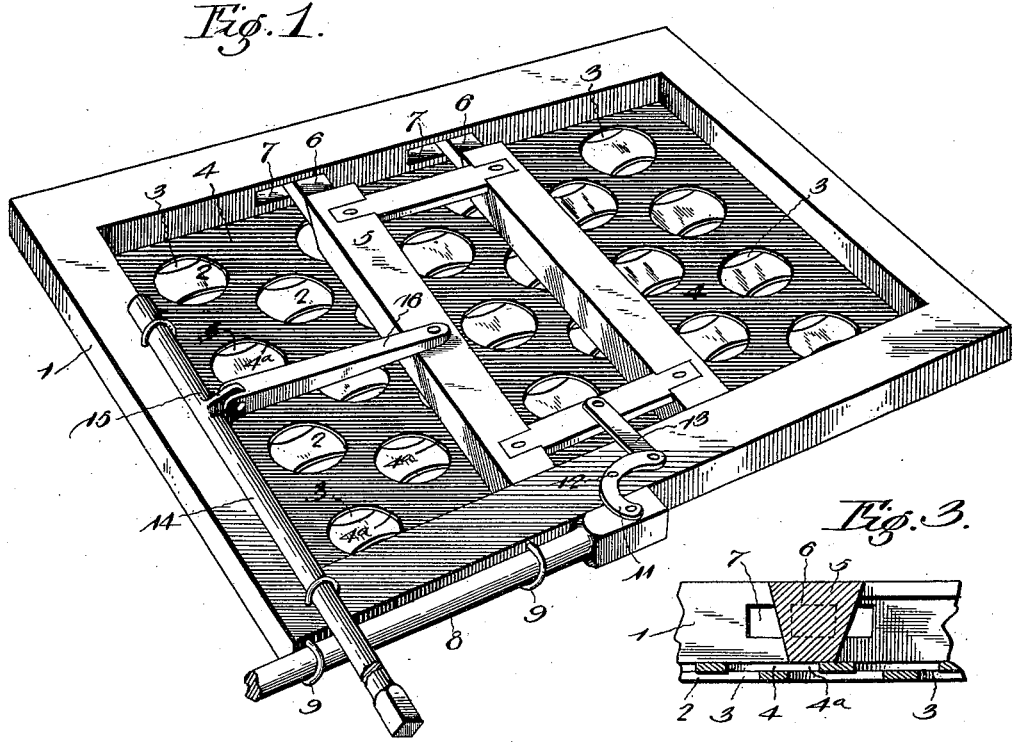
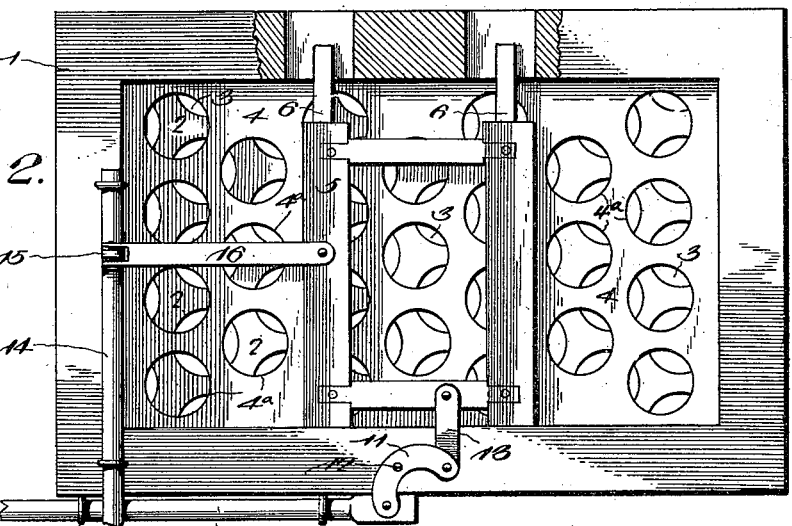
Witnesses  Arthur F. Page, Inventor.
By his Attorneys,

UNITED STATES PATENT OFFICE.

ARTHUR F. PAGE, OF HAZEL, SOUTH DAKOTA, ASSIGNOR OF ONE-FOURTH TO EDWIN B. BEETON, OF DE SMET, SOUTH DAKOTA.

SIEVE FOR SEPARATORS, FANNING-MILLS, &c.

SPECIFICATION forming part of Letters Patent No. 632,362, dated September 5, 1899.

Application filed August 3, 1898. Serial No. 687,625. (No model.)

*To all whom it may concern:*

Be it known that I, ARTHUR F. PAGE, a citizen of the United States, residing at Hazel, in the county of Hamlin and State of South Dakota, have invented a new and useful Sieve for Separators, Fanning-Mills, &c., of which the following is a specification.

The invention relates to improvements in sieves for separators, fanning-mills, and the like.

The object of the present invention is to improve the construction of sieves for separators, fanning-mills, and the like and to provide simple, inexpensive, and efficient means for regulating the size of the openings of the sieve to adapt the same for operating on various grains.

The invention consists in the construction and novel combination and arrangement of parts, as hereinafter fully described, illustrated in the accompanying drawings, and pointed out in the claims hereto appended.

In the drawings, Figure 1 is a perspective view of a sieve constructed in accordance with this invention. Fig. 2 is a plan view, partly in section. Fig. 3 is a detail sectional view illustrating the construction of the cross-bars of the movable frame.

Like numerals of reference designate corresponding parts in all the figures of the drawings.

1 designates a rectangular frame of any desired size to suit the size of the separator, fanning-mill, or other apparatus in which it is employed, and it has a sieve 2, rigidly secured to it and provided with circular openings 3. The edges of the stationary or fixed sieve 2 are spaced from the adjacent faces of the side and end bars of the frame to provide a space and form a guide for an adjustable sieve 4, having corresponding openings adapted to register with the openings 3. The adjustable or movable sieve or screen is capable of lateral and longitudinal adjustment, and when it is moved laterally to the position illustrated in Fig. 1 of the accompanying drawings the openings of the fixed sieve are divided into two smaller openings, and by adjusting the movable sieve to the position illustrated in Fig. 2 of the drawings three openings are formed at each opening of the fixed sieve.

The movable sieve or screen is secured to a rectangular frame 5, composed of cross-bars and longitudinal connecting-bars, and it is provided at the ends of the former with tongues or tenons 6, arranged in mortises or recesses 7 of the side bars of the frame and adapted to permit the movable frame to be adjusted laterally and longitudinally of the main frame 1.

The lateral adjustment of the movable sieve or screen is effected by means of a reciprocating rod or bar 8, arranged on the exterior of one of the side bars of the main frame in suitable guides 9 and having its inner end pivotally connected to one arm of a lever 11, which is of bell-crank form. The lever 11, which is curved, has its arms arranged at an angle to each other and is pivoted between its ends by a suitable fastening device 12, and its inner end is pivoted to transverse a link 13, which extends from the lever to the movable frame. The outer end of the reciprocating rod or bar 8 is designed to extend through the frame or casing of a separator or other apparatus in which the sieve is employed and be provided with a set-screw and gage for indicating the degree of adjustment, so that the adjustment may be accurately effected from the exterior of a machine.

The longitudinal adjustment of the movable frame and the sieve or screen which is carried by the same is produced by means of a transverse rock-shaft 14, journaled in suitable bearings of the main frame and provided near the center of one end thereof with an arm 15, and the latter is connected by a link 16 with the movable frame. By rotating the rock-shaft a quarter of a revolution the movable sieve or screen is carried from the position illustrated in Fig. 1 of the accompanying drawings to that shown in Fig. 2. When the arm of the rock-shaft is moved inward toward the movable frame and the inner end of the lever is adjusted in the same direction, the openings 4ª of the movable screen 4 will be caused to register with the openings 3 of the fixed screen 1. The inner end of the link 16 is pivoted to the movable frame and the outer end of the link is bifurcated and sufficient play is provided to permit the lateral adjustment of the movable frame.

The invention has the following advantages: The reciprocating bar, which adjusts the movable frame laterally, is designed to be adjusted from the exterior of a separator, fanning-mill, or the like, and the outer end of the rock-shaft is squared and is adapted to be adjusted by means of a wrench, crank-handle, or the like. The openings of the fixed and adjustable sieves or screens may be readily made to register to a greater or less extent, so that the device may operate on various kinds of grain and be employed to clean corn, oats, barley, rye, wheat, flax, and millet by simply changing the size of the openings.

What is claimed is—

1. In a device of the class described, the combination of a rectangular main frame, a fixed sieve, a movable frame arranged within the main frame, a movable sieve connected with the movable frame, a reciprocating bar arranged at one side of the main frame, a lever fulcrumed between its ends on the main frame and having its outer arm connected with the reciprocating bar, a link connecting the inner arm of the lever with the movable frame, a transverse rock-shaft journaled on the main frame and provided with an arm, and a link connected to the arm of the rock-shaft and having its inner end pivotally connected with the movable frame, substantially as described.

2. In a device of the class described, the combination of a main frame provided at opposite sides with recesses, a movable frame composed of cross-bars, and connecting-bars and provided at opposite sides with tongues fitting in the said recesses, whereby the movable frame is slidingly mounted on and adapted to move longitudinally and transversely of the main frame, means for adjusting the movable frame and the fixed and movable sieves connected respectively with the main and movable frames, substantially as described.

3. In a device of the class described, the combination of a main frame provided at opposite sides with recesses, a fixed sieve mounted upon the upper face of the main frame, a movable sieve having its edges interposed between the main frame and the fixed sieve, a movable frame located beneath and secured to the movable sieve and composed of bars disposed transversely and longitudinally of the main frame, the transversely-disposed bars being extended into the said recesses, whereby the movable frame is slidingly connected with the main frame, and means for adjusting the movable frame, substantially as described.

4. In a device of the class described, the combination of a main frame provided at opposite sides with recesses, a fixed sieve mounted upon the upper face of the main frame and provided with circular openings, a movable sieve having its edges interposed between the main frame and the fixed sieve, and provided with circular openings, a movable frame composed of bars disposed longitudinally and transversely of the main frame and connected with the movable frame, the transversely-disposed bars being extended into the said recesses, a lever of bell-crank form, fulcrumed at the lower face of one of the sides of the main frame and having one arm connected with the movable frame, and a reciprocating bar connected with the other arm of the lever, substantially as described.

In testimony that I claim the foregoing as my own I have hereto affixed my signature in the presence of two witnesses:

ARTHUR F. PAGE.

Witnesses:
D. McLAURIN,
J. W. VEDDER.